United States Patent
Schecter

(10) Patent No.: US 10,402,284 B1
(45) Date of Patent: *Sep. 3, 2019

(54) ASSISTED DEVICE RECOVERY

(71) Applicant: CSC HOLDINGS, LLC, Bethpage, NY (US)

(72) Inventor: Steven J. Schecter, Plainview, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,394

(22) Filed: Mar. 14, 2018

Related U.S. Application Data

(63) Continuation of application No. 15/492,753, filed on Apr. 20, 2017, which is a continuation of application No. 14/604,383, filed on Jan. 23, 2015, now Pat. No. 9,658,927, which is a continuation of application No. 13/616,869, filed on Sep. 14, 2012, now Pat. No. 8,977,899.

(51) Int. Cl.
*G06F 11/07* (2006.01)
*G06F 11/14* (2006.01)
*H04L 12/24* (2006.01)
*H04L 29/08* (2006.01)
*G06F 16/245* (2019.01)

(52) U.S. Cl.
CPC ...... *G06F 11/1469* (2013.01); *G06F 11/0793* (2013.01); *G06F 11/1417* (2013.01); *G06F 16/245* (2019.01); *H04L 41/0631* (2013.01); *H04L 41/0654* (2013.01); *H04L 67/303* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2001/0043731 | A1* | 11/2001 | Ito | H04N 1/00127 382/132 |
| 2010/0014435 | A1* | 1/2010 | Bugenhagen | H04L 41/0677 370/245 |
| 2010/0174949 | A1* | 7/2010 | Athey | G06F 11/0709 714/39 |
| 2011/0107137 | A1* | 5/2011 | Lam | G06F 11/0748 714/4.4 |

(Continued)

*Primary Examiner* — Yolanda L Wilson
(74) *Attorney, Agent, or Firm* — Sterne, Kessler, Goldstein & Fox, P.L.L.C.

(57) ABSTRACT

A system for assisted device recovery is provided. The system includes an assisted device recovery module configured to determine an associated recovery action associated with an identification of a client device. The assisted device recovery module includes a client device identifier that is configured to identify a client device on a network and is further configured to detect that the client device is configured incorrectly in response to change of a configuration of the network. The assisted device recovery module also includes a recovery determiner configured to choose a chosen recovery action based on priority information received. The assisted device recovery module further includes a recovery performer configured to perform the chosen recovery action on the client device.

18 Claims, 4 Drawing Sheets

(56) References Cited

U.S. PATENT DOCUMENTS

2011/0150058 A1* 6/2011 Oh .................... H04L 5/003
                                                   375/222
2012/0239973 A1* 9/2012 Walton ............. G06F 11/0712
                                                    714/15

* cited by examiner

ASSISTED DEVICE RECOVERY

CROSS-REFERENCE TO RELATED APPLICATIONS

This application is a continuation of U.S. patent application Ser. No. 15/492,753, filed Apr. 20, 2017, which is a continuation of Ser. No. 14/604,383, filed Jan. 23, 2015, now U.S. Pat. No. 9,658,927, which is a continuation of U.S. patent application Ser. No. 13/616,869, filed Sep. 14, 2012, now U.S. Pat. No. 8,977,899, the entirety of which are incorporated herein by reference.

BACKGROUND OF THE INVENTION

Field of the Invention

Embodiments relate generally to device recovery.

Background Art

In order to improve the speed, efficiency, and robustness of their networks, cable service providers are constantly engaged in various infrastructure upgrades and changes. However, in order to support these new changes and upgrades, configuration changes may sometimes be required at the client devices which access the networks. Depending on the particular change or upgrade, the client device may be inoperable until the new configuration is received. Additionally, from time to time, without any changes to a network, a client device may be in an error state that may be recoverable if the client device is reconfigured. However, typically, client devices may only receive configuration by requesting it. This usually happens at various stages of the initialization of the client devices. However, forcing the client devices to fully reinitialize in order to receive the new configuration changes has an associated disruption time where the client device is inoperable. For example, if the client device is a cable modem, the Internet may be unavailable while the cable modem is reinitializing. Additionally, while various recovery actions exist to cause a client device to reinitialize, they do not uniformly produce the same result when applied across the corpus of all cable modem makes and models.

Therefore, what is needed is an assisted device recovery system that minimizes disruption to service yet successfully recovers client devices when they are inoperable.

SUMMARY OF THE INVENTION

Embodiments of the invention include a system for assisted device recovery comprising, a CMTS is connected to a cable modem over a network, a database including a plurality of cable modem fingerprints and associated recovery actions, and an assisted device recovery module. The assisted device recovery system includes one or more processors and a memory. The assisted device recovery module also includes a cable modem identifier configured to identify the make and model of the cable modem using a fingerprint, wherein the fingerprint includes a hardware version and a software version of the cable modem, a recovery determiner configured to query the database with the cable modem fingerprint and determine an associated recovery action, and a recovery performer configured to perform the associated recovery action on the cable modem.

Embodiments of the invention additionally include a method for performing a device recovery comprising, determining an identity of a cable modem on a network using a fingerprint, wherein the fingerprint includes a hardware version and software version of the cable modem, identifying a recovery action using the fingerprint of the cable modem and database, wherein the database includes a plurality of cable modems and associated recovery actions, and performing the recovery action on the cable modem.

Embodiments of the invention additionally include an article of manufacture including a computer-readable storage medium, having instructions stored thereon that, when executed by one or more computers, cause the one or more computers to perform operations comprising, determining an identity of a cable modem on a network using a fingerprint, wherein the fingerprint includes a hardware version and software version of the cable modem, querying a database with the fingerprint of the cable modem to determine an associated recovery action, wherein the database includes a plurality of cable modems and associated recovery actions, and performing the associated recovery action on the cable modem.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
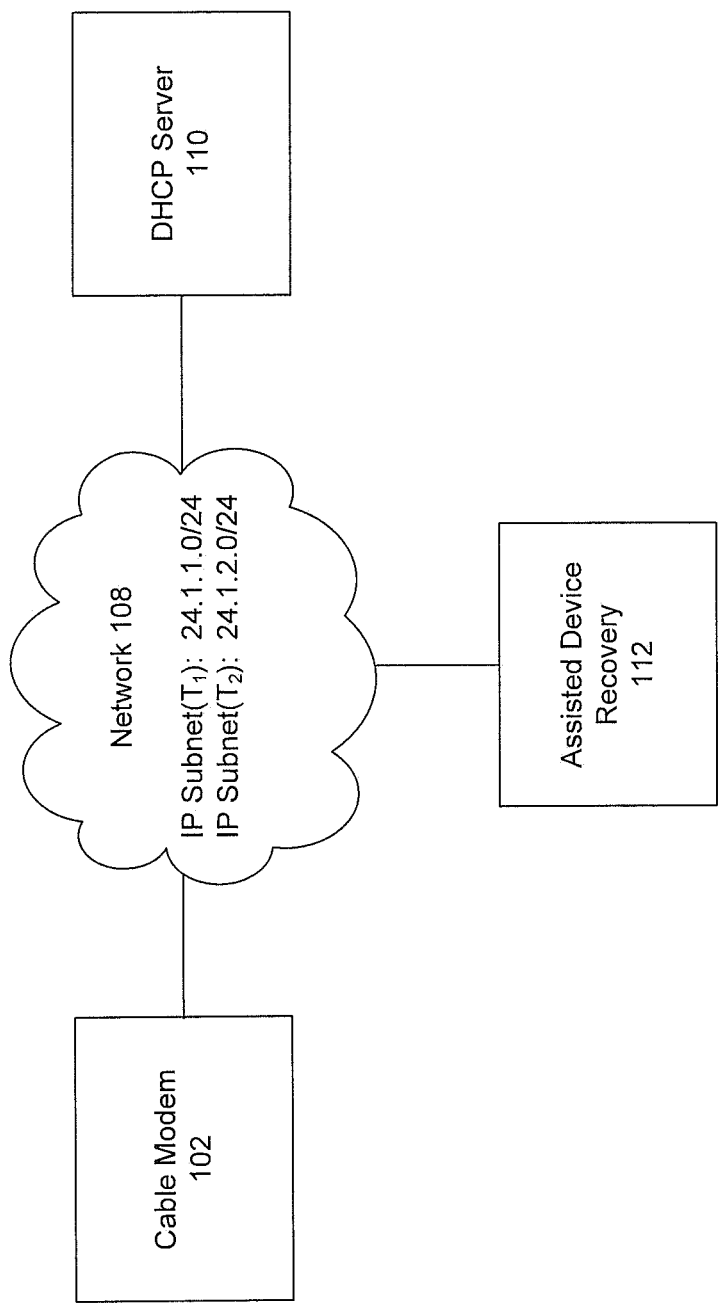
FIG. 1 is a diagram of an exemplary cable modem network architecture 100 that has had a configuration change, according to an exemplary embodiment.

FIG. 1 is a diagram of an exemplary cable modem network architecture 100 that has had a configuration change, according to an exemplary embodiment.

Cable modem network architecture 100 includes cable modem 102. Cable modem 102 may be connected to network 108. Network 108 may be any type of communications network capable of transporting data, including, but not limited to, wired, wireless, Ethernet, Wireless Fidelity (WiFi), coaxial, or fiber-optic. For example, according to an exemplary embodiment, network 108 may be a hybrid fiber-coaxial network implementing data over cable service interface specification (DOCSIS). Cable modem 102 may also be connected to one or more client devices, for example, network routers, network switches, bridges, access points, personal computers, servers, laptops, set-top boxes, mobile devices, or other computing or networking devices.

In an exemplary embodiment, cable modem 102 may be configured to operate on network 108 through the use of a configuration protocol, however, cable modem 102 may also be statically configured to operate on network 108. There may be several layers of configuration for cable modem 102. For example, cable modem 102 may receive DOCSIS and other cable modem parameters via a configuration file received during boot up. However, cable modem 102 may also be preconfigured with such configuration too. Cable modem 102 may also receive Internet Protocol (IP) and other networking information from a configuration device such as DHCP server 110 using dynamic host configuration protocol (DHCP). The DHCP protocol may be used by cable modem 102 to automatically acquire IP networking information for communicating over network 108 via IP. For example, DHCP may be used to receive an assigned IP address for cable modem 102. DHCP may also be used to receive other networking configuration information from DHCP server 110, including, but not limited to, Domain Name Service (DNS) configuration and network gateway configuration. The DNS configuration may permit cable modem 102 to resolve DNS addresses to IP addresses and the gateway information may permit cable modem 102 to properly route IP packets over network 108.

Many cable modem network operators typically limit the amount of time that a device may be assigned a particular IP address. This limitation is typically referred to as the IP address lease time. For example, some cable modem network providers may limit the lease time to a certain number of hours, such as 24 hours. However, the lease time may be set at any time interval or may even be set to an indefinite period of time. Once cable modem 102 has acquired networking information, cable modem 102 may not reacquire the networking information unless the lease time has expired or some other event has occurred. For example, the physical connection to network 108 may be lost by cable modem 102 or the power to cable modem 102 may be lost. In such cases, cable modem 102 may reacquire its networking information via a configuration device, such as DHCP server 110.

As discussed above, in some cases, cable modem 102 may fail to operate correctly on network 108. This may be a result of some failure of cable modem 102. For example, cable modem 102 may have entered an error state or may have been misconfigured. In other cases, the cable modem network operator may have changed the configuration of network 108. This may cause cable modem 102 to not operate correctly. For example, as part of infrastructure upgrades or changes, the cable modem network operator may change the IP address of a network gateway, DNS name server, the subnet, or any other network parameter of network 108, including DOCSIS parameters. However, in such cases, cable modem 102 may still be configured with the old information for network 108. This may cause cable modem 102 to fail to operate properly with network 108. For example, at a first time ($T_1$) network 108 may be configured for the 24.1.1.0/24 subnet. At such time, cable modem 102 may have an IP address assigned within the 24.1.1.0/24 subnet. However, the network operator may then change the subnet of network 108 at a second time ($T_2$). Since cable modem 102 may still have configuration information received at $T_1$, cable modem 102 may not operate properly over network 108 until new configuration information is received. However, as discussed above, depending on the configuration change, cable modem 102 may not acquire the new configuration information until the lease time expires on the old information or some other network event occurs. Accordingly, cable modem network architecture 100 includes an assisted device recovery module 112 configured to assist cable modem 102 recover in cases where cable modem 102 is not operating correctly.

Figure 2:
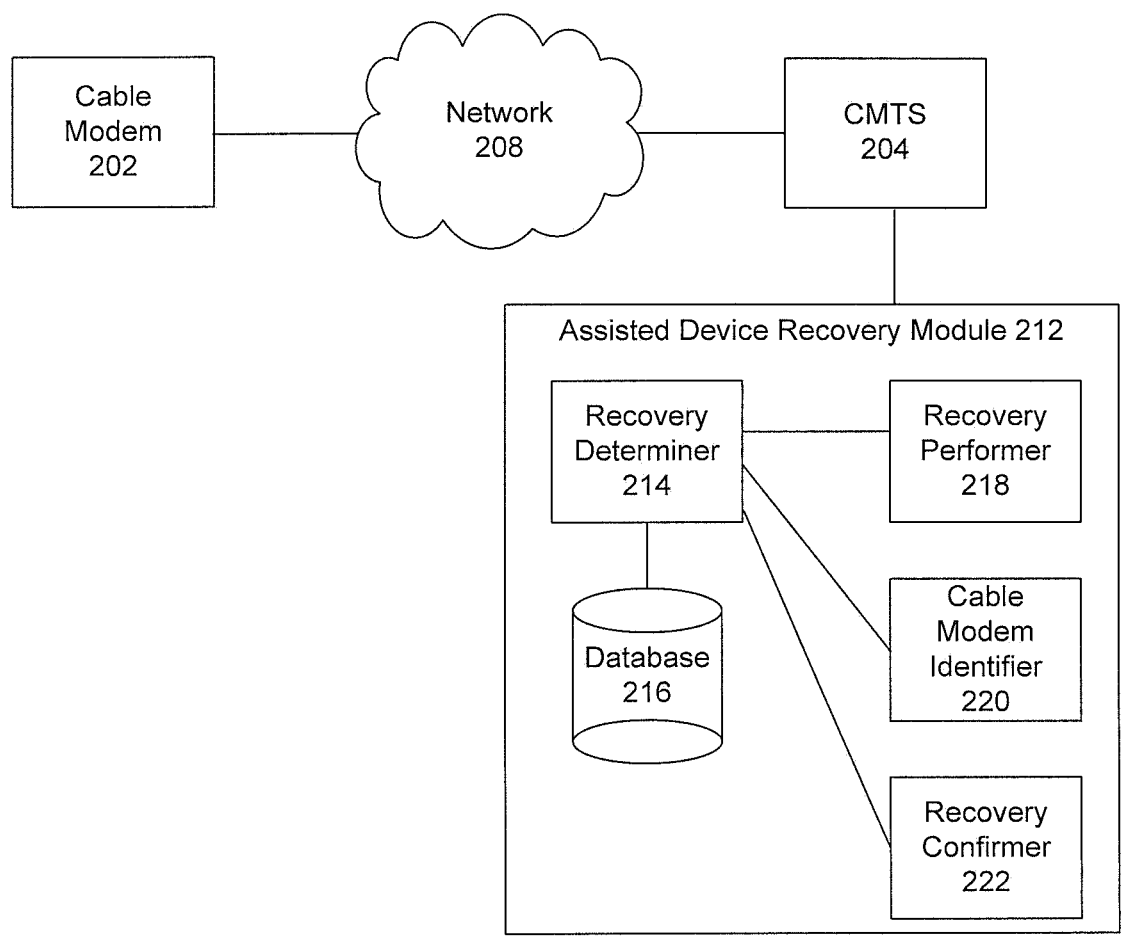
FIG. 2 is a block diagram of a system 200 for assisted device recovery, according to an exemplary embodiment.

FIG. 2 is a block diagram of a system 200 for assisted device recovery, according to an exemplary embodiment.

System 200 includes cable modem 202, cable modem termination system (CMTS) 204, network 208, and an assisted device recovery module 212. Network 208 may be any type of communications network capable of transporting data, including, but not limited to, wired, wireless, Ethernet, Wireless Fidelity (WiFi), coaxial, or fiber-optic. For example, according to an exemplary embodiment, network 208 may be a hybrid fiber-coaxial network implementing data over cable service interface specification (DOCSIS). CMTS 204 may be responsible for all communications to and from cable modem 202. For example, cable modem 202 may send all communications to CMTS over network 208 using a networking protocol such as DOCSIS. CTMS 204 may then decode the communications and route them to their intended destination such as a host on the Internet or any other combination of a local or wide-area networks. Likewise, communications that are transmitted to cable modem 202 may also be encoded by CMTS to use a networking protocol, such as DOCSIS prior to being transmitted to cable modem 202.

System 200 also includes assisted device recovery module 212. Assisted device recovery module 212 is configured to assist in the recovery of cable modem 202 in cases where cable modem 202 is not functioning properly. As discussed above, this may occur for a variety of reasons, such as configuration changes to network 208 or other networks, changes to cable modem 202 itself, or other failures. There may be a variety of techniques which can be used to detect such failures. For example, in an exemplary embodiment, the service provider may know that a failure will occur based on a configuration change to network 208. The service provider may also be able to detect failures based on monitoring devices, such as cable modem 202 or CMTS 204. The service provider may also be made aware of a failure by a user contacting the service provider. In an exemplary embodiment, assisted device recovery module 212 may be implemented with on one or more computing devices, including, but not limited to, a personal computer, laptop, desktop, server, embedded device, set top box, tablet, or a mobile device.

Assisted device recovery module 212 includes a recovery determiner 214, database 216, cable modem identifier 220, and recovery performer 218. Cable modem identifier 220 is responsible for identifying the make and model of cable modem 202. In particular, cable modem identifier 220 may determine the make and model of cable modem 202 using a fingerprint. The fingerprint may include information that identifies cable modem 202. For example, the fingerprint may include the make and model of the cable modem 202. In some cases, the fingerprint may also include version information, such as hardware version information and software version information of cable modem 202. For example, the hardware version information may describe the particular version of the hardware within cable modem 202 and the software version information may describe the particular software firmware version that cable modem 202 is running. In order to receive the fingerprint information, cable modem identifier 220 may send one or more communications using the simple network management protocol (SNMP), or any other suitable protocol for receiving fingerprint information. After receiving the request for the fingerprint, cable modem 202 may respond with one or more communications to cable modem identifier 220 including the fingerprint information. For example, cable modem identifier 220 may access cable modem 220 using the management information modem 220 for the object "iso(1).org(3).dod(6).internet(1).mgmt(2) .mib-2(1).system (1).sysDescr(1)." When cable modem 220 is queried for the "sysDescr" object, cable modem 220 may return the hardware version, vendor name, boot ROM version, software version, and model number of cable modem 220. For example, cable modem 202 may return the above-listed information using the following exemplary format, "HW_REV: <value>; VENDOR: <value>; BOOTR: <value>; SW_REV: <value>; MODEL: <value>." After receiving the above response via SNMP, cable modem identifier 202 may parse the response to determine the fingerprint information of cable modem 202. Once cable modem identifier 220 has received the fingerprint information from cable modem 202, assisted device recovery module 212 may then determine the appropriate recovery action by using recovery determiner 214.

Recovery determiner 214 is configured to query database 216 with all or part of the fingerprint information to determine a recovery action. However, the particular format of the fingerprint received by cable modem 202 may vary depending on the make and model of cable modem 202. Accordingly, in an exemplary embodiment, recovery determiner 214 may be configured to normalize the fingerprint to a common format. Database 216 is configured to associate cable modem fingerprints with recovery actions. Database 216 may be any type of database. For example, database 216, may be an SQL database, a plain text file, XML file, or any other set of data structures that may associate cable modem fingerprints with recovery actions. In an exemplary embodiment, database 216 may be stored on or within assisted device recovery module 212. However, database 216 may also be stored on a separate computing device, according to an exemplary embodiment.

In an exemplary embodiment, database 216 may be configured with at least one recovery action for every make and model of cable modem that is compatible with a particular service provider's network. For example, for the given corpus of all cable modems, only certain types of cable modems may be compatible with a service provider's network. Moreover, for any given cable modem, there may be several compatible recovery actions. A compatible recovery action may be a recovery action which succeeds in recovering cable modem 202. For example, cable modem 202 may be compatible with a reboot recovery action, a T3 or T4 timeout action, a link bounce action, or a variety of other recovery actions. While cable modem 202 may have many recovery actions that may be performed on it, depending on the particular make and model of cable modem 202, those recovery actions, when executed, may not result in the recovery of cable modem 202. Additionally, each of those actions has an associated disruption time. The disruption time may be the amount of time a cable modem is out of service while it is recovering. Accordingly, the optimum recovery action may depend on the associated disruption time, the make and model of cable modem 202 and the particular failure.

A reboot recovery action may be a recovery action which causes cable modem 202 to reboot. This action may be initialized using simple network management protocol (SNMP). The reboot recovery action may have a relatively higher disruption time because cable modem 202 may power cycle or perform a warm reboot. While the reboot recovery action may have a relatively higher disruption time, the action may also have greater compatibility with a wider variety of cable modems as well as a higher likelihood for successfully recovering cable modem 202, depending on the failure. A T3 or T4 timeout may be a recovery action initiated from CMTS 204 using DOCSIS. Issuing either of these timeouts may cause cable modem 202 to reregister with CMTS 204. For many cable modem makes and models this may cause a reacquisition of their network configuration, which in many cases, may lead to a successfully recovery. However, for certain makes or models of cable modems, this may not lead to a successful recovery. In such cases, a reboot recovery may be required to be performed. A link bounce recovery action may be initiated via SNMP. The link bounce may cause cable modem 202 to temporarily disable and then enable its LAN interface. This recovery action may have a relatively lower disruption time, however, depending on the failure and the make and model of cable modem 202 this recovery action may not always successfully recover cable modem 202. In such cases, either a T3 or T4 timeout or a reboot recovery action may be performed.

In an exemplary embodiment, database 216 may be configured to return a sorted list of compatible recovery actions for each cable modem fingerprint query. In particular, the sorted list may be sorted by the amount of disruption time associated with a particular recovery action. However, database 216 may also be configured to only return the recovery action with the least associated disruption time when queried with a fingerprint, according to an exemplary embodiment. In such cases, database 216 may be preconfigured for each make and model of cable modem with the recovery action that has the lowest disruption time and highest likelihood of recovery. The granularity of database 216 may vary from cable modem manufacturer to manufacture. For example, in some cases, the optimum recovery action may be the same for every model produced by a particular manufacturer. In such cases, database 216 may be optimized to only store a recovery action on a manufacturer by manufacturer basis. In other cases, the optimum recovery action may differ between models. In such cases, each model within a manufacturer may have an associated recovery action. In either such case, a recovery action may be determined for a particular cable modem fingerprint. Accordingly, in an exemplary embodiment, every make or model of cable modem that is compatible with a network provider's network may have an associated fingerprint and recovery action in database 216. The network provider may then update database 216 as new makes or models of cable modems are released. However, according to an exemplary embodiment, database 216 may be configured to only contain a subset of all makes or models of cable modems. For example, database 216 may be configured to include only the most popular cable modems used by customers of the service provider. In such a case, a default recovery action may be associated with a cable modem fingerprint that is not in database 206. This default recovery action may be an action that has a high compatibility and a high likelihood of recovery. For example, the default recovery action may be a reboot recovery action.

Recovery performer 218 is responsible for performing recovery actions on cable modem 202. Recovery performer 218 may be configured to perform recovery actions using a variety of different network protocols at a variety of network layers. For example, several types of recovery actions, such as the link bounce recovery action or reboot recovery action may be performed at the application layer using a protocol such as SNMP. However, other recovery actions such as the T3 or T4 timeout recovery actions may be performed using DOCSIS. In such a case, recovery performer 218 may be able to send the T3 or T4 timeout over network 208 using DOCSIS or may be able to instruct CMTS 204 to send such a recovery action.

In an exemplary embodiment, assisted device recovery module 212 may also include a recovery confirmer 222. Recovery confirmer 222 may be configured to determine whether cable modem 202 has been successfully recovered after performing the initial recovery action. In particular, recovery confirmer 222 may use network diagnostic tools to determine whether cable modem 202 has been successfully recovered. For example, recovery confirmer 222 may use the Internet Control Message Protocol (ICMP) protocol or SNMP to determine whether cable modem 202 has recovered. Recovery confirmer 222 may also use commands at the DOCSIS layer to determine whether cable modem 202 has recovered. In an exemplary embodiment, recovery confirmer 222 may be configured to delay confirming whether cable modem 202 may have been recovered based upon the recovery action used. The delay may be based in part on the disruption time associated with the particular recovery action performed. The delay may be stored in database 216, such that database 216 may be queried to determine the appropriate delay based upon the recovery action used. If cable modem 202 has been successfully recovered, recovery confirmer 222 may be configured to send a notification indicating that cable modem 202 has been successfully recovered. However, in some cases cable modem 202 may not be successfully recovered using the recovery action initially obtained by recovery determiner 214. In such a case, recovery determiner 214 may be configured to obtain an alternate recovery action for cable modem 202. As discussed above, while cable modem 202 may be compatible with a multitude of recovery actions, database 216 may be configured to return the recovery action with the least disruption time initially. In cases where the initial recovery action attempted by recovery performer 218 has failed to properly recover cable modem 202, an alternate recovery action may be tried. In an exemplary embodiment, the alternate recovery action may be the associated recovery action with the next least most associated disruption time. If the alternate recovery action also fails to properly recover cable modem 202, recovery determiner 214 may be configured to cycle through all remaining recovery actions until a recovery action has successfully recovered cable modem 202. If no recovery action has successfully recovered cable modem 202, then assisted device recovery 212 may send a notification indicating that all recovery actions have failed. The notification may be sent to the service provider, the user, or logged at cable modem 202 or at the service provider.

In an exemplary embodiment, the assisted device recovery module 212 may also be configured to record metrics relating to recovery of cable modem 202 in a database for reporting purposes. For example, assisted device recovery module may record for each recovery whether the recovery was successful or not. This may then be used to determine an aggregate number of the percentage of successful recoveries. Assisted device recovery module 212 may also record other metrics related to each part of the recovery process. For example, recovery module 212 may record the make and model of cable modem 202, the reason for recovery, or any other data point related to the recovery of cable modem 202.

Figure 3:
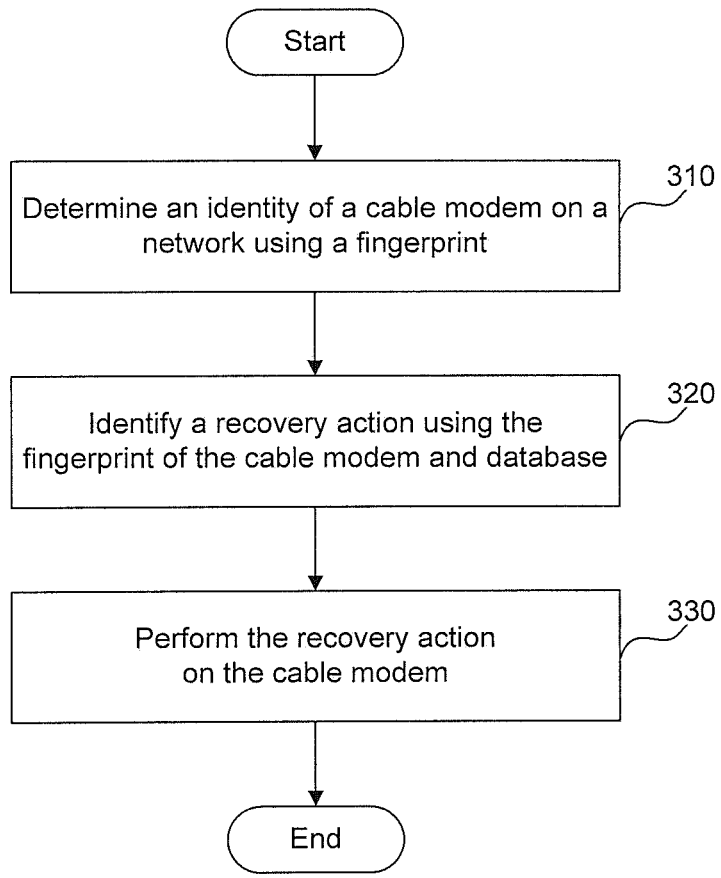
FIG. 3 is a flow diagram of a method 300 of assisted device recovery, according to an exemplary embodiment.

FIG. 3 is a flow diagram of a method 300 of assisted device recovery, according to an exemplary embodiment.

At box 310 of method 300, an identity of a cable modem on a network is determined using a fingerprint. The identity of the cable modem may be determined using a cable modem identifier, such as cable modem identifier 220 of FIG. 2. The fingerprint may include information that identifies the cable modem. For example, the fingerprint may include the make and model of the cable modem. In some cases, the fingerprint may also include version information, such as hardware version information and software version information of cable modem. In order to receive the fingerprint information, one or more communications may be sent using SNMP or any other suitable protocol for receiving fingerprint information to the cable modem. After receiving the request for the fingerprint, the cable modem may respond with one or more communications including the fingerprint information. The fingerprint information may then be used to determine a recovery action for the cable modem.

At box 320, a recovery action is determined using the fingerprint of the cable modem and database. The recovery action may be determined using a recover determiner, such as recover determiner 214 of FIG. 2. In particular, a database may be queried with the fingerprint to determine the recovery action. The particular fingerprint received from the cable modem may vary depending on the make and model of cable modem. Accordingly, in an exemplary embodiment, the fingerprint may first be normalized prior to querying the database. The database is configured to associate cable modem fingerprints with one or more recovery actions. The database may be any type of database, including, but not limited to, an SQL database, a plain text file, XML file, or any other set of data structures that may associate cable modem fingerprints with recovery actions. The database may be configured with at least one recovery action for every make and model of cable modem that is compatible with a particular service provider's network. However, in some cases the database may be configured with only the most popular cable modems on a service provider's network. The granularity of the database may also vary depending on the particular manufacturer of a cable modem and the particular make of the cable modem. When queried with a fingerprint, the database may return either the optimum recovery action or a sorted list of recovery actions based on disruption time. A compatible recovery action may be a recovery action which succeeds in recovering the cable modem. Some examples of recovery actions may include, but are not limited to, a reboot recovery action, a T3 or T4 timeout action, a link bounce action, or a variety of other recovery actions. Each of those actions has an associated disruption time. The disruption time may be the amount of time a cable modem is out of service while it is recovering. Additionally, not all of these actions may cause the cable modem to recover depending on the make and model of the cable modem and the particular failure. Accordingly, the optimum recovery action may depend on the desired disruption time, the particular failure, and the make and model of the cable modem.

At box 330, the recovery action is performed on the cable modem. The recovery action may be performed by a recovery performer, such as recovery performer 218 of FIG. 2. Recovery actions may be performed using a variety of different network protocols at a variety of network layers. For example, several types of recovery actions, such as the link bounce recovery action or reboot recovery action, may be performed at the application layer using a protocol such as SNMP. However, other recovery actions, such as the T3 or T4 timeout recovery actions, may be performed using DOCSIS.

Depending on the particular failure, the recovery action may not always be successful in recovering the cable modem. In an exemplary embodiment, confirmation of the recovery may be determined. The confirmation may be determined using a variety of network diagnostic tools. For example, recovery may be confirmed using ICMP or SNMP. If recovery is successful, a notification may be sent indicating that recovery has been successful. If recovery is determined to be unsuccessful, an alternate recovery action may be determined. In particular, in cases where multiple recovery actions are compatible with a particular make and model of cable modem, an alternate recovery action can be determined. In an exemplary embodiment, the alternate recovery action may be determined by choosing a recovery action with the next least most disruption time compared to the initial recovery action performed. In particular, as discussed above, the database may be configured to return a sorted list of recovery action, such a sorted list may then be used to determine the alternate recovery action. If the alternate recovery action is also unsuccessful, the remaining recovery actions may be cycled through and each performed until recovery is successful. If all of the recovery actions compatible with the cable modem have been performed, but the cable modem has yet to recover from the failure, a notification may be sent indicating that recovery was unsuccessful.

In an exemplary embodiment the results of the recovery may be recorded in a database for reporting purposes. For example, whether the recovery of the cable modem was successful or not may be recorded in the database. This may then be used to determine an aggregate number of the percentage of successful recoveries. However, other metrics related to each part of the recovery process may also be recorded. For example, the make and model of cable modem may be recorded, the reason for recovery, or any other data point related to the recovery of the cable modem.

Figure 4:
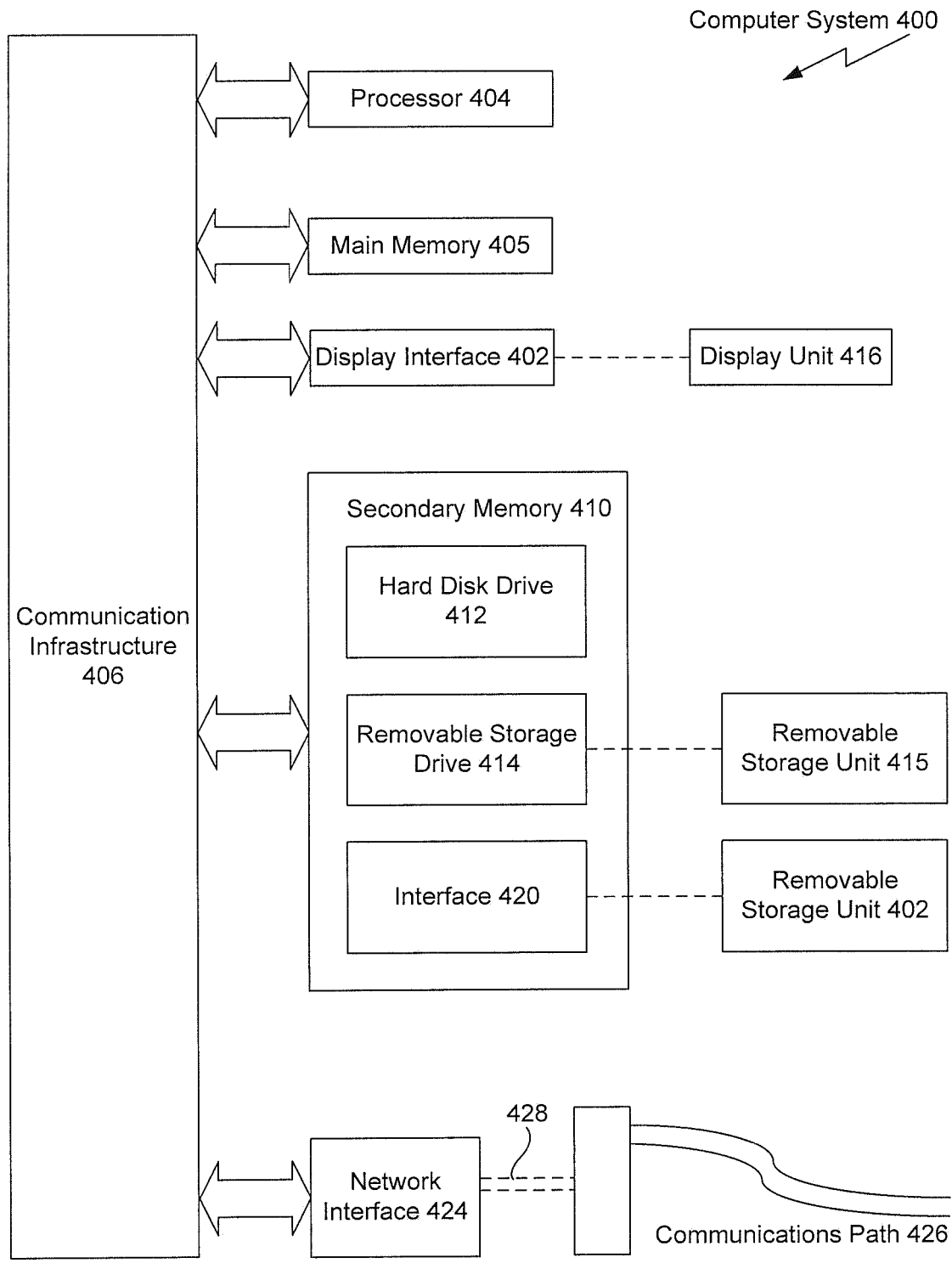
FIG. 4 illustrates an example computer system in which embodiments as described above, or portions thereof, may be implemented.

FIG. 4 illustrates an example computer system 400 in which embodiments as described above, or portions thereof, may be implemented. For example, cable modem network architecture 100, system 200, assisted device recovery module 212, or method 300, including portions thereof, may be implemented using computer system 400. Computer system 400 may use hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-3.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a physical memory may be used to implement the above-described embodiments. A processor device may be a single processor, a plurality of processors, or combinations thereof. Processor devices may have one or more processor "cores."

As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Various embodiments of the invention are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 400 also includes a main memory 408, for example, random access memory (RAM), and may also include a secondary memory 410. Secondary memory 410 may include, for example, a hard disk drive 412 and removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored thereon computer software and/or data.

In alternative implementations, secondary memory 410 may include other similar storage means for allowing computer programs or other instructions to be loaded into computer system 400. Such storage means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the term "computer readable storage medium" is used to generally refer to media such as removable storage unit 418, removable storage unit 422, and a hard disk installed in hard disk drive 412. Computer readable storage medium may also refer to memories, such as main memory 408 and secondary memory 410, which may be memory semiconductors (e.g. DRAMs, etc.).

Some embodiments may be directed to computer products comprising software stored on any computer readable storage medium. Such software, when executed in one or more data processing devices, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments.

What is claimed is:

1. A system, comprising: an assisted device recovery module comprising: a memory; one or more processors coupled to the memory and configured to determine an associated recovery action associated with an identification of a client device by a client device identifier, wherein the client device identifier is configured to identify, via the one or more processors, the client device on a network, wherein the client device identifier is further configured to detect, via the one or more processors, that the client device is configured incorrectly in response to change of a configuration of the network; a recovery determiner configured to: receive, via the one or more processors, a set of associated recovery actions for the client device with corresponding sorting information; and choose, via the one or more processors, a chosen recovery action based on the corresponding sorting information received, wherein to choose the chosen recovery action comprises: selecting, from the set of associated recovery actions, a recovery action having a highest priority when the set of associated recovery actions comprises a plurality of recovery actions, or selecting a default recovery action when the set of associated recovery actions comprises fewer than two recovery actions; and a recovery performer configured to perform, via the one or more processors, the chosen recovery action on the client device.

2. The system of claim 1, wherein the set of associated recovery actions comprises two or more associated recovery actions,
wherein the recovery determiner is further configured to sort, via the one or more processors, the set of associated recovery actions by the corresponding sorting information, and
wherein the recovery determiner is further configured to choose, via the one or more processors, the chosen recovery action from the sorted set of associated recovery actions.

3. The system of claim 2, wherein the sorting information comprises at least one characteristic of the associated recovery actions.

4. The system of claim 1, wherein the chosen recovery action is a device reboot recovery action or a link bounce recovery action.

5. The system of claim 1, wherein the chosen recovery action is a T3 timeout recovery action or a T4 timeout recovery action.

6. The system of claim 1, wherein the priority of the associated recovery actions is based on an associated likelihood of success for each of at least two of the associated recovery actions.

7. The system of claim 1, wherein the priority of the associated recovery actions is based on an associated disruption time for each of at least two of the associated recovery actions.

8. The system of claim 1, wherein the recovery determiner, upon a determination that the chosen recovery action was unsuccessful, is further configured to choose, via the one or more processors, a next recovery action from the set of associated recovery actions, wherein the next recovery action has a next highest priority.

9. A computer-implemented method for performing a device recovery comprising: detecting, via one or more processors, that a client device on a network is configured incorrectly in response to change of a configuration of the network; identifying, via the one or more processors, the client device on the network; receiving, via the one or more processors, a set of associated recovery actions for the client device with corresponding sorting information; choosing, via the one or more processors, a chosen recovery action based on the corresponding sorting information received, wherein the choosing comprises: selecting, from the set of associated recovery actions, a recovery action having a highest priority when the set of associated recovery actions comprises a plurality of recovery actions, or selecting a default recovery action when the set of associated recovery actions comprises fewer than two recovery actions; and performing, via the one or more processors, the chosen recovery action on the client device.

10. The method of claim 9, wherein the set of associated recovery actions comprises two or more associated recovery actions, and wherein the method further comprises:
sorting, via the one or more processors, the set of associated recovery actions by the corresponding sorting information, and
choosing, via the one or more processors, the chosen recovery action from the sorted set of associated recovery actions.

11. The method of claim 9, wherein the sorting information comprises at least one characteristic of the associated recovery actions.

12. The method of claim 9, wherein the chosen recovery action is a device reboot recovery action or a link bounce recovery action.

13. The method of claim 9, wherein the chosen recovery action is a T3 timeout recovery action or a T4 timeout recovery action.

14. The method of claim 9, wherein the priority of the associated recovery actions is based on an associated likelihood of success for each of at least two of the associated recovery actions.

15. The method of claim 9, wherein the priority of the associated recovery actions is based on an associated disruption time for each of at least two of the associated recovery actions.

16. The method of claim 9, wherein the chosen recovery action is performed using DOCSIS or SNMP.

17. The method of claim 9, further comprising:
upon a determination, via the one or more processors, that the chosen recovery action was unsuccessful:
choosing, via the one or more processors, a next recovery action from the set of associated recovery actions, wherein the next recovery action has a next highest priority.

18. A non-transitory computer-readable storage medium, having instructions stored thereon that, when executed by one or more computer processors, cause the one or more computer processors to perform operations comprising: detecting that a client device on a network is configured incorrectly in response to change of a configuration of the network; identifying the client device on the network; receiving a set of associated recovery actions for the client device with corresponding sorting information; choosing a chosen recovery action based on the corresponding sorting information received, wherein the choosing comprises: selecting, from the set of associated recovery actions, a recovery action having a highest priority when the set of associated recovery actions comprises a plurality of recovery actions, or selecting a default recovery action when the set of associated recovery actions comprises fewer than two recovery actions; and performing the chosen recovery action on the client device.

* * * * *